Oct. 13, 1925.
H. H. SEELEY
MOTOR VEHICLE TOP
Filed Jan. 30, 1922   3 Sheets-Sheet 1
1,556,638
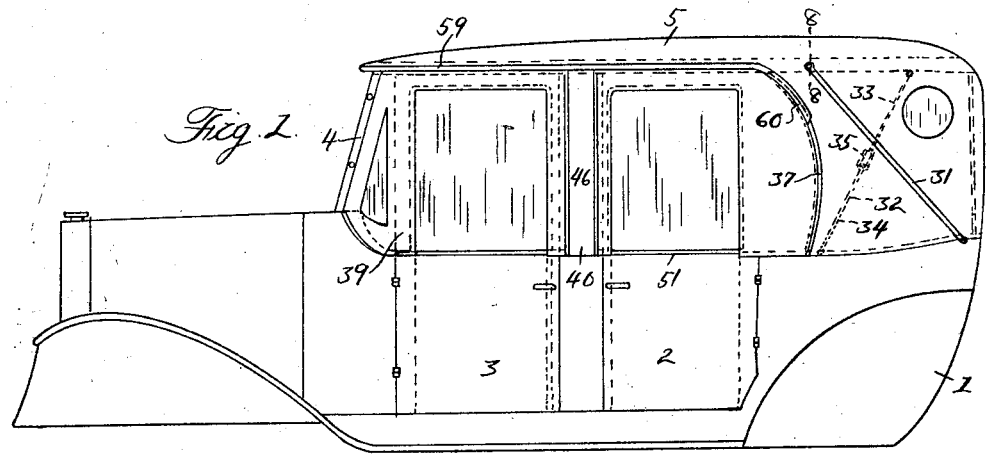
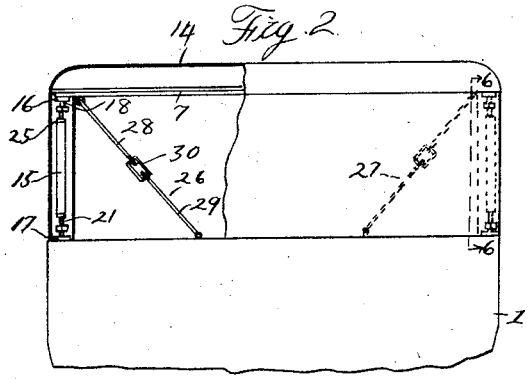
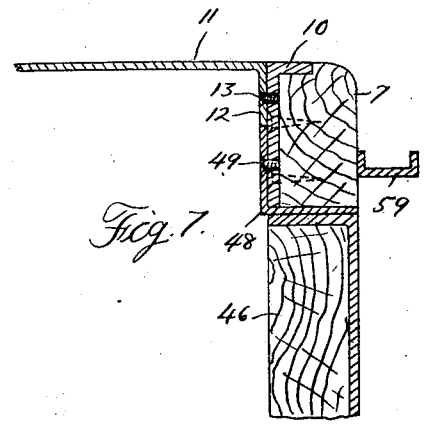
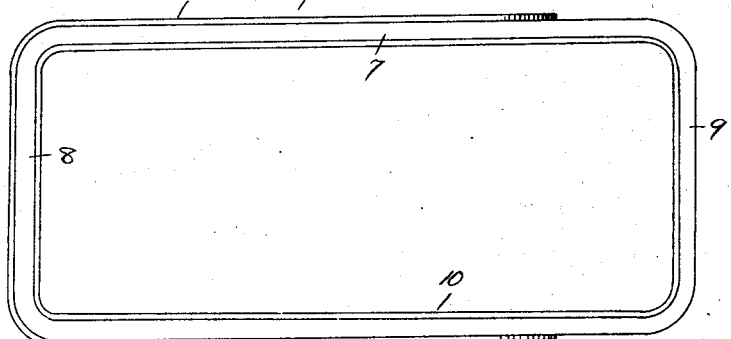
Inventor
Halstead H. Seeley

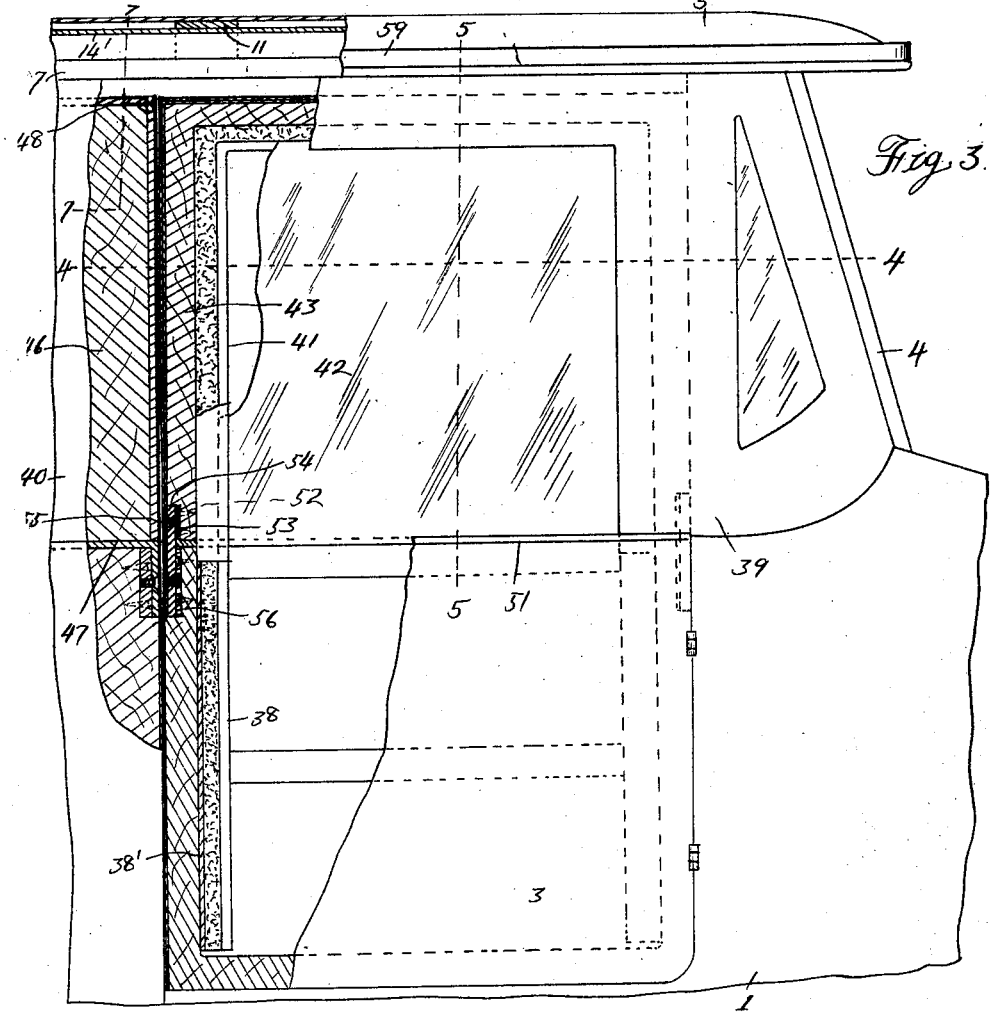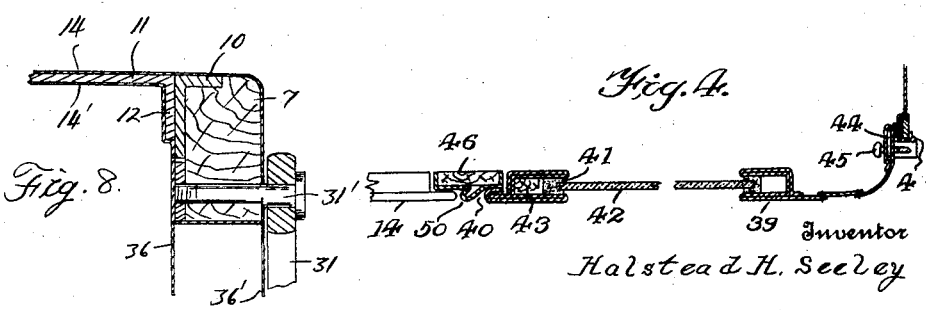

Oct. 13, 1925.
H. H. SEELEY
MOTOR VEHICLE TOP
Filed Jan. 30, 1922
1,556,638
3 Sheets-Sheet 3
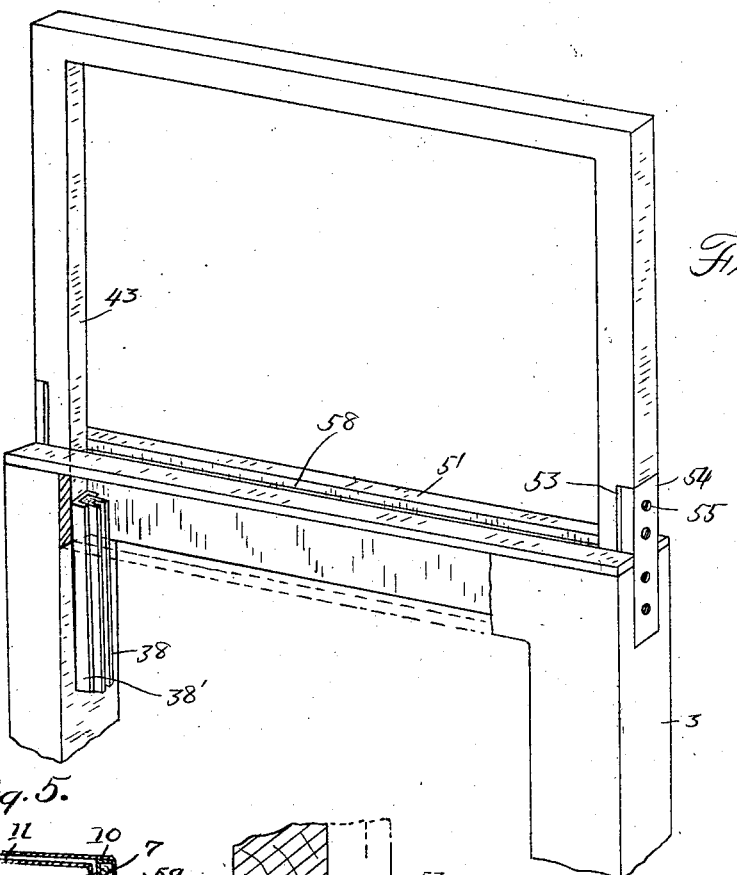
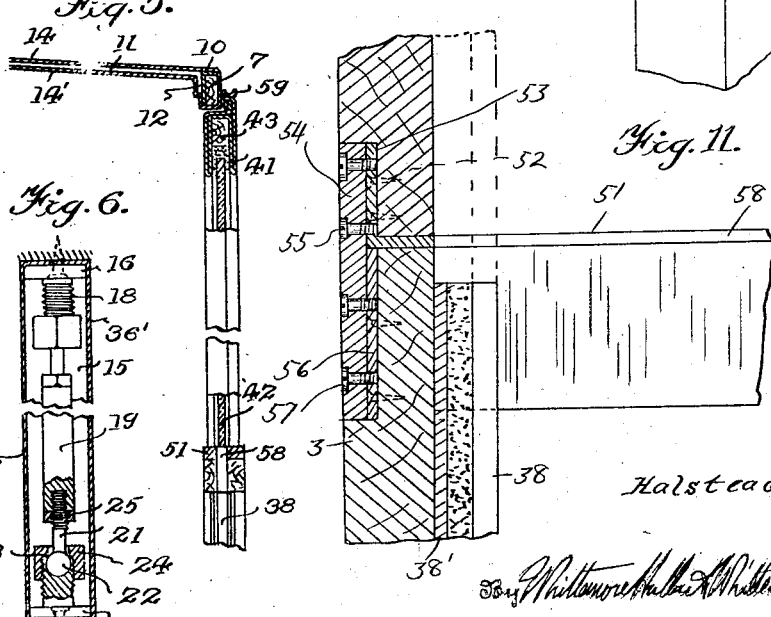
Inventor
Halstead H. Seeley
Attorneys Patented Oct. 13, 1925.

1,556,638

UNITED STATES PATENT OFFICE.

HALSTEAD H. SEELEY, OF ANN ARBOR, MICHIGAN, ASSIGNOR TO MOTOR PRODUCTS CORPORATION (1923), OF DETROIT, MICHIGAN, A CORPORATION OF NEW YORK.

MOTOR-VEHICLE TOP.

Application filed January 30, 1922. Serial No. 532,554.

*To all whom it may concern:*

Be it known that I, HALSTEAD H. SEELEY, a citizen of the United States of America, residing at Ann Arbor, in the county of Washtenaw and State of Michigan, have invented certain new and useful Improvements in Motor-Vehicle Tops, of which the following is a specification, reference being had therein to the accompanying drawings.

The invention relates to motor vehicle tops and has for one of its objects the provision of a top which is rigid and at the same time of light weight, and which is constructed to secure all of the advantages and comforts of a closed top built permanently with the automobile body. Closed cars having rigid tops which are built permanently with the bodies have necessarily been of excessive weight due to the fact that the tops themselves have been of excessive weight requiring stronger and heavier bodies. Furthermore, the space required for manufacturing a closed car of this type is much greater than that required for manufacturing an open car of the same seating capacity, due to the fact that a closed car body with the top is conveyed through the factory on its bottom or horizontally, whereas an open car body is conveyed through a factory on end or vertically. Other automobiles, such as touring cars having the usual winter tops or having tops formed of sections individually secured to the body, are objectionable due to the fact that in the first instance, the top has considerable weight and is movable relative to the body when the automobile is in operation, while in the second instance, the sections are movable relative to each other as well as relative to the body. Consequently, with both of these constructions, rattling occurs, and furthermore, either the top or its sections, or the body of the automobile, or both the top or its sections, and the body are subjected to great wear.

Another object of my invention is to provide a top which may be assembled upon the body of the automobile after the latter has been completed in the factory so that the latter may be conveyed through the factory on end, thereby requiring the minimum floor space. Further objects of the invention are to provide a top which may be laterally adjustably secured to the automobile body to vertically align the top with the body; to arrange the means for laterally adjusting the top relative to the body so that this means will constitute a connection between the top and body to rigidly hold the top relative to the body; and to so arrange the side closures that their guideways for receiving the glass sections will register with the guideways for the glass sections in the doors, and further to provide the closures with pliable portions which will bend to permit of opening the doors. The invention has for other objects, the novel features of construction and combinations and arrangement of parts as more fully hereinafter set forth.

In the drawings:

Figure 1 is a side elevation of an automobile body and top embodying my invention;

Figure 2 is a rear elevation thereof, partly broken away;

Figure 3 is an enlarged side elevation partly in section of a portion of the automobile;

Figures 4 and 5 are respectively cross sections on the lines 4—4 and 5—5 of Figure 3;

Figure 6 is a cross section on the line 6—6 of Figure 2;

Figure 7 is a cross section on the line 7—7 of Figure 3;

Figure 8 is a cross section on the line 8—8 of Figure 1;

Figure 9 is a bottom plan view of the top frame;

Figure 10 is a perspective view showing the reinforcement for a side closure of the top secured to a door of the body;

Figure 11 is a sectional elevation through a portion of the construction shown in Figure 10.

1 is the body of the automobile which in the present instance is of the touring type, and 2 and 3 are the doors on each side of the body, the rear door 2 being pivoted at its rear edge and the front door 3 being pivoted at its forward edge. 4 is one of the windshield standards rigidly mounted upon the cowl of the body, there being a standard at each side of the body. The construction of body including the windshield standards as thus far described is the usual touring car construction, so that during the manufacture of this body, it may be conveyed through the factory on end, or vertically, as is usual with touring car bodies, thereby requiring the minimum floor space.

5 is the top having the continuous rigid frame 6 with a contour corresponding substantially to the contour of the body 1 and formed of the side bars 7 and the front and rear cross bars 8 and 9 respectively. These bars are preferably formed of wood and have the metallic angle bar 10 rigidly secured thereto on their inner and upper faces for reinforcing and making the frame fairly rigid. 11 are sheet metal bowed strips having at their ends the depending flanges 12 secured to the inner faces of the reinforcing angle irons 10 by suitable means such as the machine screws 13. These strips 11 have an appreciable width and are so spaced longitudinally upon the side bars of the frame that the fabric roof 14 supported thereon, will throughout its extent be continuously flush, thereby avoiding any ridges or depressions therein. There is also the fabric roof lining 14' on the under sides of the bowed strips 11 for concealing the same. 15 are standards extending between the top frame 6 and the automobile body 1 and supporting the top frame. These standards extend between the rear cross bar 9 of the top frame and the rear upper edge of the body, and each comprises the head 16 and the base 17 at its upper and lower ends respectively, the transversely extending threaded stems 18 upon the head and the base, and the intermediate rod 19 secured to these stems. The head 16 and the base 17 are rigidly secured to the rear cross bar and the automobile body respectively, by suitable means such as the screws 20.

To laterally adjust the top frame so that it will vertically align with the body of the automobile when assembling the top upon the body, each of the standards is made so that its head is laterally movable relative to its base. In detail, the intermediate rod 19 of each standard is secured to the threaded stem 18 at each end by means of the threaded rod 21 threadedly engaging the adjacent end of the intermediate rod and having at its opposite end the spherical head or ball 22 engaging in a spherical recess 23 in the end of the adjacent threaded stem, this spherical head or ball being held to its seat by means of the cap 24 threadedly engaging the threaded stem. There is also the lock nut 25 engaging the threaded rod 21 and adapted to abut each end of the intermediate rod 19 to clamp the threaded rod from rotation relative to the intermediate rod.

In assembling the top frame upon the automobile body, the front cross bar 8 of the frame is rigidly secured upon the windshield standards 4 and the heads of the standards 15 are rigidly secured to the rear cross bar 9 of the frame and the bases of the standards to the upper edge of the rear end of the body. However, the caps 24 of the standards are loose to permit of universal adjustment of the intermediate rods 19 relative to their respective heads and bases. For the purpose of laterally adjusting the top frame relative to the body, there are the upwardly diverging tie connections 26 and 27 each comprising a tie rod 28 pivoted to the rear cross bar 9 of the top frame, the tie rod 29 pivoted to the upper edge of the rear end of the body at a point nearer the median line of the body, and the turn buckle 30 threadedly engaging adjacent end of these tie rods. The tie rods 28 are secured to the lower side of the rear cross bar of the top frame, so that the tie connections may be concealed as more fully hereinafter described. By tightening or loosening the turn buckles, the top frame is laterally adjusted relative to the body, and furthermore, after the frame has been laterally adjusted to vertically align the same with the body, tightening of both the turn buckles will rigidly secure the top to the body so that the one cannot move relative to the other. Also, after this lateral adjustment has taken place, the caps 24 upon the standards are tightened down to further assist in rigidly securing the top to the body.

To further assist in rigidly mounting the top upon the body, there is the downwardly and rearwardly inclined brace 31 at each side of the body and pivotally connected to the outer sides of the body and the side bar 7 of the top frame. 32 is a downwardly and forwardly inclined tie connection extending between the lower side of each side bar 7 of the top frame and the upper edge of the side of the body near its rear end, this tie connection comprising the tie rods 33 and 34 pivoted respectively to the side bar and body and connected by the turn buckle 35 which, upon tightening, places the brace 31 under compression and also assists in holding the top frame firmly down upon the windshield standards 4. In order to allow for inaccuracy in the commercial manufacture, the upper end of each brace 31 is connected to its side bar 7 by an eccentric 31' which may be rotatively adjusted so that the brace will be placed under compression upon the tightening of the side tie connections.

36 and 36' are fabric inner and outer side walls extending between the top frame and the automobile body and inclosing the supporting standards between the rear of the top frame and body and all the tie connections, these side walls being sufficiently spaced to permit of necessary adjustment of the parts without the side walls coming into contact therewith after the side walls have been secured in final position. The forward edges of these side walls are secured to the posts 37 extending between and secured to the lower sides of the top frame side bars and the upper edges of the sides of the body to maintain a neat appearance. The braces 31, however, are outside of these walls.

For the purpose of permitting of the use of glass and at the same time permitting of various degrees of ventilation as desired, the doors 2 and 3 are hollow and have the guideways 38 for glass sections which are adapted to be raised or lowered by suitable means (not shown) and the front and rear fabric side closures 39 and 40 are provided with guideways rigidly secured to the doors and registering with the guideways 38 when the side closures are attached. As shown in Figure 3 particularly, the guideways 38 are formed of suitable fabric such as felt upon channel reinforcement bars 38' and the guideways 41 for receiving the glass section 42 are formed of felt or the like carried upon and firmly secured to a reinforcing frame 43 preferably formed of wood, the front fabric side closure 39 being secured as by stitching to the felt and around the reinforcing frame and extending forwardly and being detachably secured to the rear side of the windshield standard 4. In detail, the forward edge of the front side closure has the stiffening member 44 which is apertured to pass over the windshield clamping thumb nuts 45 and be engaged by their inner faces to clamp the same upon the windshield standards. This construction is shown and described in detail in my co-pending application, Serial No. 518,773 filed November 30, 1921 upon side curtains for motor vehicles. The rear fabric side closure 40 also has a guideway for the glass section in the rear door of the body, the whole being reinforced by a frame in the same manner as the front side closure, this rear fabric side closure extending rearwardly and overlapping the forwardly extending portion of the outer side wall 36' to which it is detachably secured. For each of the side closures 39 and 40 there is a sufficient portion of the fabric which is pliable above the pivots of the door to permit of readily bending the fabric in opening and closing the door.

To close the space between the adjacent edges of the side closures 39 and 40 on each side of the automobile, there is the post 46, the base 47 of which is detachably secured to the upper edge of the automobile body intermediate the doors and the top of which is detachably secured to the side bars 7 of the top frame as by means of the angle iron 48 permanently secured to the top of the post and detachably secured to the inner side of the angle iron 10 of the frame by suitable means such as the machine screws 49. This post forms the abutment for the swinging edges of the side closures 39 and 40, and to weatherproof the joint between the swinging edge of the rear side closure 40 and the post, there is the outwardly and rearwardly extending vertical lip 50 which extends beyond the outer face of the rear side closure adjacent to its extreme swinging edge.

The reinforcing frames 43 for the side closures 39 and 40 are detachably rigidly secured to the doors 2 and 3 of the body. In detail, 51 are metallic bars permanently rigidly secured to the reinforcing frames 43 by means of the wood screws 52 threadedly engaging the frames and passing through the upwardly extending flanges 53 at the ends of the bars. 54 are flat metallic bars secured to the flanges 53 by machine screws 55 and also to the upper front and rear edges of the doors, these flat bars being detachably secured to the doors. In order to reduce the wear caused by mounting and dismounting of the frames upon the doors, I have provided plates 56 permanently secured to the front and rear edges as by wood screws, which plates are threadedly engaged by machine screws 57 detachably securing the flat bars 54 thereto. The flat bars are preferably set into both the doors and reinforcing frames to be flush with their front and rear edges. These bars have the elongated openings 58 through which the glass sections 42 may be slid.

To make the construction weatherproof between the upper edges of the front and rear side closures 39 and 40 and the top frame, and also between the rear edges of the rear side closures and the front edges of the outer side wall 36', there is the channel shaped drip mold or trough 59 secured to the outer sides of the front cross bar 8 and the side bars 6 of the top frame and terminating in downwardly extending portions 60 secured to the posts 37 above the joint formed between the rear side closures and the outer side wall.

In the event that it is desired to operate the automobile without the side closures 39 and 40, but to use the usual construction of side curtain having celluloid windows, the side closures may be removed by unfastening the same from the outer side wall 37 and windshield standards 4 and by removing the reinforcing frames 43 with their bases 51 from the doors as well as the posts 46 with their bases 47 from the portions of the body intermediate the doors. After the removal of the posts and reinforcing frames, the upper edges of the doors and the upper edge portions of the body intermediate the doors are covered with imperforate caps corresponding in shape to the bases of the parts removed and also having depending securing flanges at their ends to engage in the front and rear edges of the doors and of the portions of the body between these doors, the arrangement being such that the body of the automobile still presents a neat and pleasing appearance, and furthermore, the interiors of the doors are protected.

From the above description, it will be readily seen that I have provided a rigid light weight top for an automobile which is rigidly mounted upon the body and may be assembled on the body after the latter has been completed so that as a consequence, the body may be made in the same manner as an open car body, thereby requiring the minimum floor space in the factory. Another feature is that of laterally adjusting the top upon the body to vertically align the one with the other. Furthermore, the top has side closures which have portions rigidly secured to the doors of the body and adapted to swing therewith, and other pliable portions above the pivots of the door permitting of the swinging. These door portions of the side closures have guideways registering or in alignment with the guideways in the doors to receive the glass sections which may be raised or lowered, as desired. Thus it is seen that with my top, all the advantages of a closed top built permanently with the body of the automobile are secured with the disadvantages of excessive weight, rattling and wear avoided.

What I claim as my invention is:

1. The combination with a motor vehicle body, of an attachable top having standards pivotally mounted upon said body to permit of lateral adjustment of said top relative to said body, and tension members connected to said top and body for laterally adjusting said top relative to said body to align the former with the latter.

2. The combination with a motor vehicle body, of an attachable top having supporting standards pivotally mounted upon said body to permit of lateral adjustment of said top relative to said body to align the former with the latter, adjustable tie connections between said top and body for laterally adjusting said top relative to said body, and side walls between said top and body upon opposite sides of said tie connections.

3. The combination with a motor vehicle body, of an attachable top comprising a frame having side bars and a rear cross bar and supporting standards pivotally connected to said rear cross bar and also to said body, tie rods between said rear cross bar and body for laterally adjusting said top relative to said body to align the former with the latter, a brace rod between each of said side bars and said body, a tie rod between each of said side bars and said body for placing said brace rod under compression, and side walls between said top and body inclosing all of said tie rods.

4. The combination with a motor vehicle body having a door provided with a guideway for a glass, of a top secured to said body, and a side closure for said top comprising a reinforcement frame independently attachably secured to said body, and a fabric covering for said frame including a guideway for a window registering with the guideway in said door.

5. The combination with a motor vehicle body having a door with a guideway therewithin for a glass, of a top, and a side closure for said top comprising a reinforcement frame, a supporting base for said frame upon the upper end of said door and attachably secured thereto, and a fabric covering upon said frame including a guideway registering with said guideway in said door and adapted to receive the glass, said base having an elongated opening permitting of the passage of the glass therethrough.

6. The combination with a motor vehicle body, of an attachable top comprising a continuous frame having side and front and rear cross bars, angle bars for reinforcing said frame and cross bars secured to said angle bars for supporting the fabric of said top extending between said side bars and secured to said angle bars.

7. The condition with a vehicle body, of an attachable top, standards supporting said top upon said body, each of said standards having portions rigidly secured to said top and to said body and provided with a universal connection with one of the portions aforesaid.

8. The combination with a vehicle body and an attachable top therefor, of a brace connected to said top and body, adjustable tension members for drawing said top toward said body to place said brace under compression, and a cam for regulating the compression of said brace.

9. The combination with a motor vehicle body, of an attachable top having a frame, braces extending between said body and frame, adjustable standards extending between said body and frame, and adjustable tension members extending between said body and frame for placing said braces and standards under compression.

10. The combination with a motor vehicle body, of an attachable top having a frame, braces extending between said body and frame, adjustable standards extending between said body and frame, and means extending between said body and frame for placing said braces and standards under compression.

11. The combination with a vehicle body, of an attachable top therefor, a plurality of standards supporting said top upon said body, each of said standards having a base rigidly secured to said body and provided with a member having a universal connection with said base.

12. The combination with a vehicle body, of an attachable top, adjustable means connected to the body for supporting said top, means extending between said top and body for moving said top relative to said body, and means under compression and connected to said body and top for holding said top in adjusted position.

13. The combination with a vehicle body, of an attachable top, sectional standards connected to the body for supporting the top, diagonal members extending between said top and body for moving said top relative to said body, and means under compression and connected to the body and top for holding said top in adjusted position.

14. The combination with a vehicle body having a door frame provided with guide ways for receiving the side edges of a window, of an inverted substantially U-shaped frame having guide ways for receiving the side edges of said window, the side bars of said door frame having recesses therein, the side bars of said U-shaped frame having recesses in alignment with the recesses aforesaid, plates located in the recesses in said door frame and secured thereto, plates located in the recesses in said U-shaped frame and secured thereto, bars located in said aligned recesses, and headed elements detachably securing said bars to the plates in said door frame and to the plates in said U-shaped frame for connecting the latter to the door frame.

15. The combination with a vehicle body, of an attachable top, sectional standards connected to the body for supporting the top, diagonal members extending between said top and body for moving said top relative to said body, and a brace under compression connected to the body and top for holding said top in adjusted position.

In testimony whereof I affix my signature.

HALSTEAD H. SEELEY.